May 5, 1953      G. N. HOUSTON      2,637,630
METHOD OF BURNING SULFUR
Filed July 6, 1948
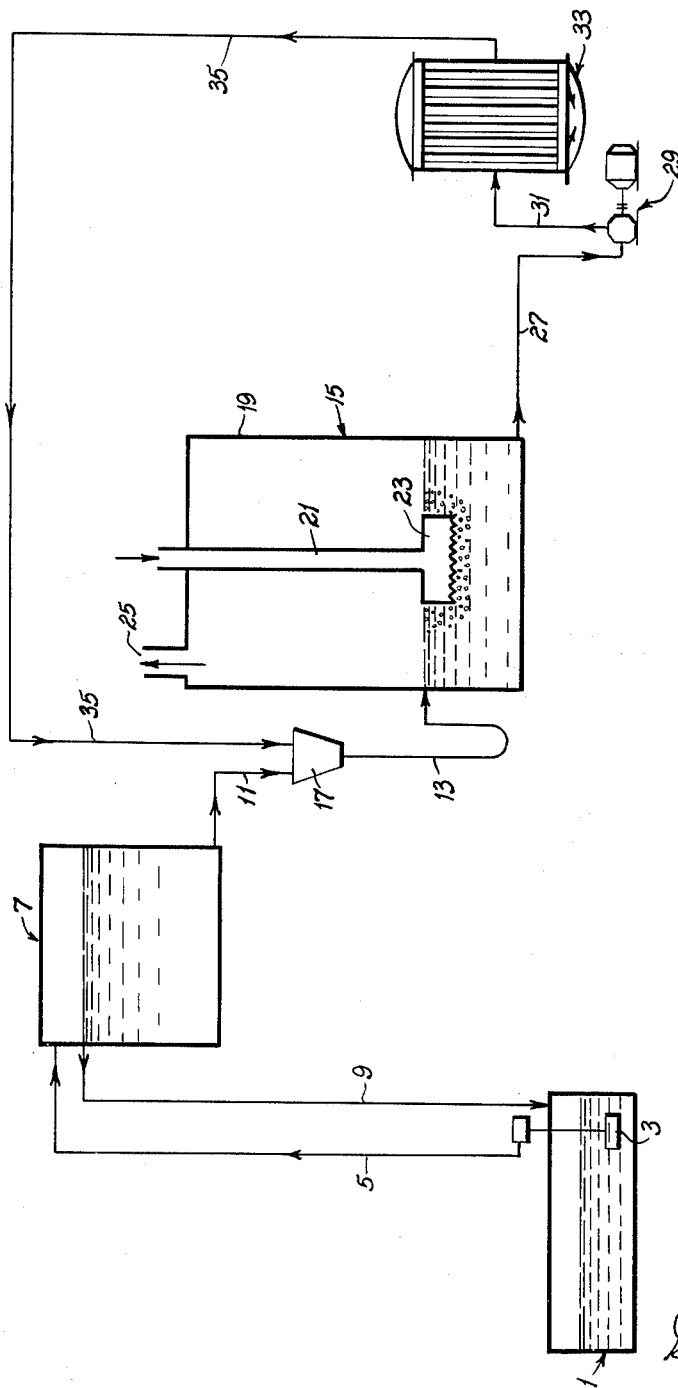

Patented May 5, 1953

2,637,630

UNITED STATES PATENT OFFICE 2,637,630

METHOD OF BURNING SULFUR

Gaines N. Houston, Houston, Tex., assignor, by mesne assignments, to Mathieson Chemical Corporation, New York, N. Y., a corporation of Virginia Application July 6, 1948, Serial No. 37,240

3 Claims. (Cl. 23—179)

This invention relates to sulfur burners and more particularly to continuous sulfur vaporizer and burner systems.

Among the several objects of this invention are the provision of sulfur burner systems for producing gas containing sulfur dioxide and vapor phase sulfur relatively free from impurities; the provision of systems of the type referred to which give increased yields of sulfur dioxide and vapor phase sulfur; the provision of sulfur burner systems which render possible closer control of effluent gas concentrations, and the provision of sulfur burner systems of the class described which effect a substantial increase in operating efficiency and unit production. Other objects will be in part apparent and in part pointed out hereinafter.

The invention accordingly comprises the elements and combinations of elements, steps and sequence of steps, features of construction and manipulation, and arrangements of parts which will be exemplified in the structures and methods hereinafter described, and the scope of the application of which will be indicated in the following claims.

In the accompanying drawing, in which one of the various possible embodiments of the invention is illustrated, the single figure is a flow diagram showing the various components of a sulfur vaporizer and burner system of the present invention.

Commercial grade sulfur, such as that obtained by the Frasch process, normally contains inorganic and organic impurities. These impurities, although usually present in only small percentages, are sufficient to contaminate effluent gases from sulfur burner systems, often to such a degree as to render these gases undesirable for many purposes. Increasing amounts of impurities in the body of molten sulfur due to the removal of vaporized sulfur cause greater quantities of the contaminants to be carried in the effluent gases. One of the primary uses of sulfur dioxide is in the conversion of sulfur dioxide to sulfur trioxide in the contact process for manufacturing sulfuric acid. It is of importance in this process as well as in many other processes that the gases be substantially dust and impurity free.

Various methods have been utilized in the past for production of a purified effluent gas from sulfur burners, including purifying the gaseous reaction products or purifying the sulfur that will later be vaporized and burned. There are numerous difficulties with these methods and the apparatus utilized to effect them. One expedient frequently used to obtain effluent gases of high purity is to shut down from time to time and manually clean out the apparatus. Another is to draw off periodically and discard the sulfur then in the vaporizer burner. Both procedures are uneconomical because the impure sulfur so withdrawn or cleaned out normally contains 90% or more sulfur. However, burning sulfur even with such a small proportion of impurities present is impossible without seriously contaminating the gaseous reaction products and in a relatively short time destroying the efficiency of a contact catalyst.

In accordance with the present invention a sulfur burner system has been devised which efficiently produces effluent gas of high purity. Intermittent manual clean-out operations, hot gas filters and other purification arrangements are eliminated, together with the expense associated therewith. It has been found that by continuously withdrawing a small portion of the molten sulfur being vaporized and burned, purifying this portion and then returning this purified portion to the body of molten sulfur, the percentage of impurities in the molten sulfur body may be conveniently maintained below a level which will unduly contaminate the effluent gas.

Referring now to the drawing, there is indicated generally at numeral 1 a sulfur melting pit. Solid sulfur may be charged into this pit either continuously or intermittently. Melted sulfur from pit 1 is forced by means of a pump 3 through a pipe 5 to a constant head feed tank 7. An overflow line 9 also connects tank 7 with pit 1. A feed line 11 serves to drain molten sulfur from the bottom of tank 7, through a pipe 13 to a sulfur vaporizer and burner unit 15 controlled by means of a feed control unit 17. Pipe 13 is formed so as to act as a liquid seal to maintain an above-atmospheric pressure in the space above the molten sulfur in unit 15.

Sulfur vaporizer and burner unit 15 includes a volatilization zone 19 of any conventional heat and sulfur resistant material such as brick; an air duct 21 having one extremity, which may carry an injector head 23, submerged beneath the surface of the body of molten sulfur contained in the lower portion of chamber 19; an outlet 25 for gaseous reaction products leading to a conventional type combustion chamber (not shown); and, an outlet pipe 27. A pump 29 aids the flow of molten sulfur through pipe 27 and a line 31 to a purifier unit such as a filter 33. This filter may be of any conventional type, as, for example, a removable leaf type such as is manufactured by The Niagara Filter Corporation. The purified molten sulfur output of filter 33 is carried through a line 35 to feed control unit 17 and from there is returned to the body of molten sulfur in chamber 19.

The operation is as follows:

Solid sulfur in any convenient shape or size is fed into tank 1 either intermittently or continuously, manually or mechanically. Tank 1 is maintained by any conventional heating arrangement at a temperature high enough to keep the sulfur liquid. The sulfur is transferred from pit 1 through line 5 to feed tank 7 by action of pump 3. The level of molten sulfur in tank 7 is maintained substantially constant at a predetermined level by properly positioning the inlet of line 9 in the side of tank 7. The sulfur in tank 7 is maintained fluid by a sufficient supply of heat thereto. The amount of molten sulfur drained from tank 7 to unit 15 is effectively and simply controlled by control unit 17, which may be, for example, a valve.

The molten sulfur enters unit 15 through pipe 13 at substantially the top surface of the molten sulfur mass contained therein. Air under pressure is transmitted through duct 21 and dispersed through the foraminous under surface of the injector head 23 into the top portion of the sulfur body, thus forming air bubbles which course upwardly through the sulfur toward the surface. The gaseous reaction products, including sulfur dioxide and vapor phase sulfur, are conducted out of unit 15 through outlet 25. This effluent gas comprising vapor phase sulfur and sulfur dioxide is fed into the customary type of combustion chamber (not shown) wherein the vapor phase sulfur is subjected to oxidation to convert it to sulfur dioxide.

Pump 29 continuously removes a portion of molten sulfur, preferably from the bottom portion of the sulfur mass in unit 15. The sulfur thus withdrawn is fed into filter 33 where impurities are removed. Purified sulfur is then carried through pipe 35 to unit 15, the flow thereof being easily and accurately controlled by feed control 17.

Organic as well as inorganic impurities in the molten sulfur body in unit 15 are thus maintained at a level where the gaseous sulfur dioxide and vapor phase sulfur effluent from outlet 25 is substantially free from contaminants which would otherwise be present. The effluent gas may be then further oxidized in the customary way to convert vapor phase sulfur to sulfur dioxide. This sulfur dioxide gas is of such purity that a hot gas filter may be dispensed with entirely.

The system of the present invention thus increases the overall efficiency in conversion due to the elimination of periodic shutdowns. Loss of sulfur discarded in the purification step is minimized, a saving in power is obtained due to elimination of the hot gas filter and the elimination of plugging of the filter and catalyst beds due to the solid contaminants in the gases, and closer control is secured over vaporizing and burning of sulfur as well as over effluent gas concentration.

Although a melting pit such as pit 1 and a constant head feed tank such as tank 7 are customarily employed and are accordingly shown, they are not part of the present invention. Similarly, other sulfur purifying units than filter 33 may be utilized.

In view of the above, it will be seen that the several objects of the invention are achieved and other advantageous results attained.

As many changes could be made in the above constructions and methods without departing from the scope of the invention, it is intended that all matter contained in the above description shall be interpreted as illustrative and not in a limiting sense.

I claim:

1. The method of vaporizing and burning sulfur comprising continuously intermixing air with a mass of molten sulfur in a volatilization zone, continuously removing gaseous effluent therefrom, continuously removing a minor portion of said molten sulfur from the lower part of said molten sulfur mass, continuously purifying said minor portion in a zone separated from and out of gaseous communication with said volatilization zone and returning said purified portion to said molten sulfur mass.

2. The method of vaporizing and burning sulfur comprising bubbling air through an upper portion of a mass of molten sulfur in a volatilization zone, continuously removing the gaseous effluent therefrom, permitting the impurities in said sulfur mass to settle to a lower portion of the sulfur mass, continuously removing a fraction of the lower molten sulfur portion from said zone, continuously purifying said fraction by filtration in a zone separated from and out of gaseous communication with said volatilization zone, and continuously returning said purified fraction to said upper portion of said molten sulfur mass.

3. The method of vaporizing and burning sulfur comprising continuously feeding molten sulfur into an upper portion of a mass of molten sulfur in a volatilization zone, continuously bubbling air through said upper portion, continuously removing the gaseous effluent therefrom, permitting the impurities in said sulfur mass to settle to a lower portion of the sulfur mass, continuously removing a fraction of the lower molten sulfur portion from said zone, continuously purifying said fraction by filtration in a zone separated from and out of gaseous communication with said volatilization zone, and continuously returning said purified fraction to said upper portion of said molten sulfur mass.

GAINES N. HOUSTON.

References Cited in the file of this patent

UNITED STATES PATENTS

| Number | Name | Date |
|---|---|---|
| 1,832,013 | Gillett | Nov. 17, 1931 |
| 1,948,345 | Garofalo | Feb. 20, 1934 |
| 2,053,211 | Villars | Sept. 1, 1936 |
| 2,165,170 | Laury | July 4, 1939 |
| 2,253,566 | Klepetko | Aug. 26, 1941 |
| 2,295,605 | Ridler | Sept. 15, 1942 |
| 2,390,400 | Taylor | Dec. 4, 1945 |
| 2,424,495 | Neelley | July 22, 1947 |
| 2,445,112 | Grace et al. | July 13, 1948 |
| 2,516,832 | Rosenbloom | July 25, 1950 |
| 2,595,447 | Brann | May 6, 1952 |